United States Patent
Kaiser

(10) Patent No.: US 9,748,876 B2
(45) Date of Patent: Aug. 29, 2017

(54) CONTROL DEVICE FOR AN ELECTRIC MACHINE, METHOD FOR CONTROLLING SAID ELECTRIC MACHINE, AND MOTOR CONTROLLER

(71) Applicant: Robert Bosch GmbH, Stuttgart (DE)

(72) Inventor: Nils Kaiser, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/115,303

(22) PCT Filed: Jan. 22, 2015

(86) PCT No.: PCT/EP2015/051255
§ 371 (c)(1),
(2) Date: Jul. 29, 2016

(87) PCT Pub. No.: WO2015/113891
PCT Pub. Date: Aug. 6, 2015

(65) Prior Publication Data
US 2017/0005604 A1    Jan. 5, 2017

(30) Foreign Application Priority Data
Jan. 31, 2014   (DE) .................. 10 2014 201 758

(51) Int. Cl.
*H02K 29/08* (2006.01)
*H02P 6/16* (2016.01)
(Continued)

(52) U.S. Cl.
CPC ............ *H02P 6/16* (2013.01); *G01D 5/2448* (2013.01); *H02P 25/03* (2016.02)

(58) Field of Classification Search
CPC ...... H02P 3/00; H02P 5/00; H02P 6/00; H02P 7/00
(Continued)

(56) References Cited

U.S. PATENT DOCUMENTS

| 8,471,552 B2 * | 6/2013 | Suzuki ............ G01D 5/145 324/207.21 |
| 2011/0031913 A1 | 2/2011 | Mori et al. |
| 2013/0300337 A1 | 11/2013 | Nagaoka et al. |

FOREIGN PATENT DOCUMENTS

| DE | 19928482 | 12/2000 |
| DE | 10233604 | 2/2004 |

(Continued)

OTHER PUBLICATIONS

International Search Report for Application No. PCT/EP2015/051255 dated Apr. 22, 2015 (English Translation, 2 pages).

*Primary Examiner* — Antony M Paul
(74) *Attorney, Agent, or Firm* — Michael Best & Friedrich LLP

(57) ABSTRACT

The present invention discloses a control device for an electric machine comprising a sensor interface designed to receive a sensor signal from a position sensor of the electric machine, wherein the position sensor is designed to detect the rotor position of the electric machine, a signal generator designed to generate a beat signal that corresponds to the sensor signal with a signal frequency increased by a beat frequency, a summation unit designed to form a sum signal from the sum of the beat signal with the sensor signal, and a correction unit designed to calculate a correction value for the sensor signal on the basis of a minimum of the sum signal. The present invention further discloses a corresponding method and a corresponding motor controller.

14 Claims, 4 Drawing Sheets

(51) Int. Cl.
*G01D 5/244* (2006.01)
*H02P 25/03* (2016.01)

(58) Field of Classification Search
USPC ...... 318/400.37, 400.38, 400.39, 400.4, 605,
318/652, 661, 400.01, 400.02, 400.14,
318/700, 701, 721, 779, 799, 430, 432,
318/437; 388/800, 909, 911;
324/207.13, 207.15, 207.24
See application file for complete search history.

(56) References Cited

FOREIGN PATENT DOCUMENTS

| DE | 102009022084 | 11/2010 |
|----|--------------|---------|
| EP | 2413495 | 2/2012 |

* cited by examiner

CONTROL DEVICE FOR AN ELECTRIC MACHINE, METHOD FOR CONTROLLING SAID ELECTRIC MACHINE, AND MOTOR CONTROLLER

BACKGROUND OF THE INVENTION

The present invention relates to a control device for an electric machine, a corresponding method and a corresponding motor controller.

A multiplicity of electric motors are used today in modern technical applications. For example, modern motor vehicles, e.g. hybrid vehicles or electric vehicles, can be operated by an electric motor. Electric motors can, however, also be installed, e.g., in industrial mechatronic systems.

In order to efficiently control such electric motors, it is necessary to very precisely detect the rotor position thereof. In synchronous motors, this can be carried out by inductive position transmitters. Such inductive position transmitters generate both a sine track and a cosine track, from which the rotor position of the respective electric motor can be calculated by means of an arc tangent function.

The angular value calculated by means of the arc tangent function can, however, be distorted if the angular position between the sinus track emitted by the sensor and the cosine track emitted by the sensor is not exactly 90°. In FIG. 6, a diagram is depicted which shows the angular error between the calculated and the actual angle if the angular position between the sine track and the cosine track of the sensor is not exactly 90°.

Such a distortion of the angular value negatively affects the transformation from the coordinate system fixed to the rotor into the coordinate system fixed to the stator, whereby the current indicator in the motor controller of the electric motor is set incorrectly.

In order to prevent this distortion of the angular value, an angle which is separate in each case for the sinus track and the cosine track can be calculated by means of an arc sine function or respectively an arc cosine function. The difference between the two calculated angles, which deviates from 90°, yields the correction factor for the angular calculation. To this end, the sine track and the cosine track must however be normalized to the value range +/−1. The normalizing of the sine track and the cosine track is however impeded by signal noise and eccentricities.

The American patent application US2013300337 shows a known motor controller.

SUMMARY OF THE INVENTION

The present invention discloses a control device, a method and a motor controller3.

Provision is thus made for:
a control device for an electric machine comprising a sensor interface designed to receive a sensor signal from a position sensor of the electric machine, wherein the position sensor is designed to detect the rotor position of the electric machine, a signal generator designed to generate a beat signal on the basis of the sensor signal, said beat signal corresponding to the sensor signal with a signal frequency deviating by a beat frequency, a summation unit designed to form a sum signal from the sum of the beat signal with the sensor signal, and a correction unit designed to calculate a correction value for the sensor signal on the basis of a minimum of the sum signal.

Provision is furthermore made for:

a method for controlling an electric machine, comprising the steps: acquiring a sensor signal from a position sensor of the electric machine, wherein the position sensor is designed to detect the rotor position of the electric machine, generating, on the basis of the sensor signal, a beat signal which corresponds to the sensor signal with a signal frequency that deviates by a beat frequency, adding the beat signal to the sensor signal to form a sum signal, and calculating a correction value on the basis of a minimum of the sum signal.

Provision is finally made for:
a motor controller for an electric machine comprising a control signal generator designed to generate a control signal for the electric machine, a position sensor designed to detect the rotor position of the electric machine and a control device according to the invention, which provides a correction value to the control signal generator.

The insight underlying the present invention is that a correction of the detected angle of the rotor of the electric machine is not only possible by means of the arc sine function and the arc cosine function.

The concept underlying the invention is then to take this insight into account and to provide an option to carry out this correction on the basis of the generation of a beat.

To this end, the present invention makes provision for a beat signal to be generated in addition to a sensor signal of a sensor that detects the rotor position of the electric machine.

In so doing, the beat signal itself comprises the sensor signal, the frequency of which has been changed by a predetermined beat frequency.

If the beat signal is added to the sensor signal, a beat results in the sum signal, the minimum of which beat constitutes a correction value for the rotor position of the electric machine and is proportional to the deviation of the rotor position.

The present invention has the advantage that a normalization of the measuring signal is not necessary. The present invention furthermore provides a great deal of robustness with respect to signal noise because said signal noise can be filtered when demodulating the beat to the beat frequency.

In one embodiment, the sensor signal comprises a sine signal and a cosine signal. This makes it possible to use the present invention with known inductive position sensors or position transmitters.

In one embodiment, the sensor generator is designed to generate a sine beat signal for the sine signal and a cosine beat signal for the cosine signal. This makes it possible to generate corresponding beat signals on the basis of the signals of an inductive position sensor or position transmitter.

In one embodiment, the summation unit is designed to generate a sinus sum signal from the sinus beat signal and the sinus signal and to generate a cosine sum signal from the cosine beat signal and the cosine signal. This makes it possible to generate corresponding beat signals on the basis of the signals of an inductive position sensor or position transmitter.

In one embodiment, the correction unit is designed to calculate the correction value on the basis of the temporal difference between the minimum of the sine sum signal and the minimum of the cosine sum signal. This makes it possible to easily calculate the correction value. In one embodiment, the minimum can thus be defined respectively as the minimum of the envelope of the sine sum signal and the minimum of the envelope of the cosine sum signal.

In one embodiment, the signal generator comprises a phase control loop, which receives the sine signal and the cosine signal and outputs the frequency of the sine signal and cosine signal, and an adder, which outputs the sum of the beat frequency with the frequency of the sine signal and cosine signal as the signal frequency. A phase control loop or also PLL, phase locked loop, makes it possible to easily determine the frequency of the sine signal and the cosine signal. Because the sine signal as well as the cosine signal are detected by the same position sensor, they have the same frequency.

In one embodiment, the signal generator comprises a sine generator, which is designed to generate the sine beat signal having the signal frequency, and a cosine generator, which is designed to generate the cosine beat signal having the signal frequency. If the sine beat signal and the cosine beat signal are generated having the same frequency as the sine signal and the cosine signal, a beat can be very easily generated by means of summation.

Another embodiment consists of generating an oscillation having the beat frequency and to superimpose said oscillations with respect to one another. In this case, it is therefore not necessary to determine the frequency of the signal from the sensor.

In one embodiment, the correction unit comprises a first rectifier designed to rectify the sine sum signal and a first low-pass filter designed to filter the rectified sine sum signal. As a result, it is possible to calculate the envelope of the sine sum signal, from which the minimum can very easily be determined.

In one embodiment, the correction unit comprises a second rectifier designed to rectify a cosine sum signal and a second low-pass filter designed to filter the rectified cosine sum signal. As a result, it is possible to calculate the envelope of the cosine sum signal, from which the minimum can very easily be determined.

In one embodiment, the correction unit has a first detector designed to detect the minimum of the filtered sine sum signal and a second detector designed to detect the minimum of the filtered cosine sum signal. The respective minimum can be very simply detected on the basis of the respective envelope.

In one embodiment, the correction unit comprises a differentiator designed to calculate the temporal difference between the point in time of the detection of the minimum of the filtered sine sum signal and the point in time of the detection of the minimum of the filtered cosine sum signal and to output said temporal difference as the correction value. It is possible to very simply calculate the correction value by means of a simple difference formation.

In one embodiment, the correction unit comprises a median filter designed to filter the correction value prior to being outputted. The median filter is used to stabilize the correction value. A low-pass filter can alternatively be used instead of a median filter.

In one embodiment, the sensor interface comprises a low-pass filter designed to filter the sensor signal. In one embodiment, the sensor interface further comprises a subtraction unit, which subtracts the low-pass filtered signal from the sensor signal in order to remove the direct component of the sensor signal. As a result, faults having a direct component in the sensor signal can be removed.

The embodiments and modifications mentioned above can, where relevant, be arbitrarily combined with one another. Further possible embodiments, modifications and implementations of the invention do not explicitly comprise stated combinations of features of the invention previously described or described below with regard to the exemplary embodiments. The person skilled in the art will also add individual aspects as improvements or additions to the respective basic form of the present invention, such as, for example, but not limited to other demodulation methods for the envelope of the beat or other filter embodiments.

BRIEF DESCRIPTION OF THE DRAWINGS

The present invention is explained below in detail with the aid of the exemplary embodiments specified in the schematic figures of the drawings. In the drawings.

In all of the figures, identical or respectively functionally identical elements and devices are provided with the same reference signs, provided that nothing else has been specified.

DETAILED DESCRIPTION

Figure 1:
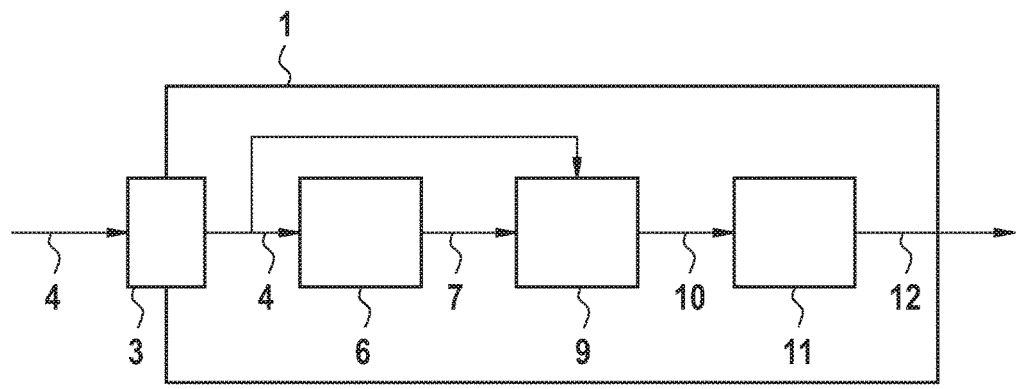
FIG. 1 shows a block diagram of an embodiment of a control device according to the invention.

FIG. 1 shows a block diagram of an embodiment of a control device 1 according to the invention.

The control device 1 comprises a sensor interface 3 which is coupled to a signal generator 6. The signal generator 6 is coupled to a summation unit 9 which is coupled to a correction unit 11.

Via the sensor interface 3, the control device 1 receives a sensor signal 4 from a position sensor 5 (not depicted), which is a component of the electric machine 2 (not depicted) and detects the rotor position thereof.

The signal generator 6 generates a beat signal 7 from the sensor signal 4 or an adjusted frequency. In so doing, the beat signal 7 corresponds in the first case to the sensor signal; however, with a signal frequency 23 altered by the amount of the beat frequency 8.

The beat signal 7 is added to the sensor signal 4 by means of the summation unit 9 and is outputted as a sum signal 10.

On the basis of a minimum 20, 21 of the sum signal 10, the correction unit 11 calculates a correction value 12 for the sensor signal 4 and outputs the same.

In one embodiment, the device 1 can be constructed from discrete components. In another embodiment, the device 1 is arranged in a computing device, e.g. a microcontroller, an ASIC, a processor or something similar. In so doing, the sensor interface 3 can be designed as a digital or analog I/O port of the computing device.

The position sensor 5 is usually designed as an inductive position transmitter 5, which outputs a sine signal 13 and a cosine signal 14 in the sensor signal 4. Because the sine signal 13 and the cosine signal 14 can have an angular position of more or less than 90° as a result of manufacturing tolerances and disturbances, such as, e.g., eccentric wobbling movements, the correction signal 12 is required to correct the rotor angle calculated from the sine signal 13 and the cosine signal 14 or respectively the calculated rotor position.

If the sensor signal 4, as described above, comprises a sine signal 13 and a cosine signal 14, the sensor interface 3, the signal generator 6, the summation unit 9 and the correction unit 11 will carry out the necessary calculations on the basis of the sine signal 13 and the cosine signal 14. This is described in greater detail in connection with FIG. 4.

Figure 2:
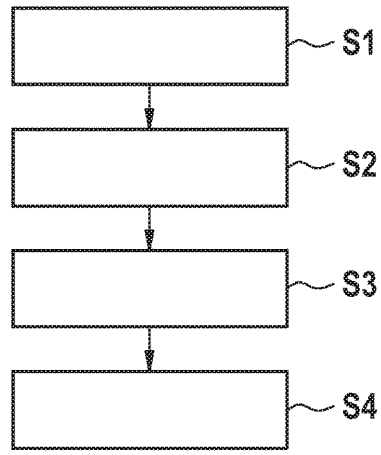
FIG. 2 shows a flow diagram of an embodiment of a method according to the invention.

FIG. 2 shows a flow diagram of an embodiment of a method according to the invention.

In a first step S1, provision is made in the method for a sensor signal 4 from the position sensor 5 of the electric motor 2 to be received. In this case, the position sensor 5 measures the rotor position of the electric machine 2.

In a second step S2, provision is made for a beat signal 7 to be generated on the basis of the sensor signal 4, which corresponds to the sensor signal having a signal frequency 23 altered by a beat frequency 8. As an alternative, an oscillation having the beat frequency can be added without the sensor signal 4 being processed.

In a third step S3, the beat signal 7 is added to the sensor signal 4 to form a sum signal 10.

Finally in step S4, a correction value 12 is calculated on the basis of a minimum 20, 21 of the sum signal.

In one embodiment of the method, the sensor signal 4 comprises a sine signal 13 and a cosine signal 14. In such an embodiment, a sinus beat signal 16 and a cosine beat signal 17 are generated when generating S2 the beat signal 7.

The sine beat signal 16 is added to the sine signal 13 in order to obtain a sine sum signal 18. Furthermore, the cosine beat signal 17 is added to the cosine signal 14 in order to generate a cosine sum signal 19.

Finally, the correction value 12 is calculated on the basis of the temporal difference between the minimum 20 of the sine sum signal 18 and the minimum 21 of the cosine sum signal 19. In one embodiment, the minimum 20 and the minimum 21 can in each case be defined as the minimum 20, 21 of the envelope of the sine sum signal 18 or respectively the cosine sum signal 19.

In one embodiment, the frequency 26 of the sine signal 13 and the cosine signal 14, which is the same for both signals (see above), is altered by the amount of the beat frequency 8 and is outputted as the signal frequency 23. The sine beat signal 16 and the cosine beat signal 17 are then generated with the signal frequency 23. The sine sum signal 18 is generated from the sine beat signal 16 generated in this manner and the sine signal 13. The cosine sum signal 19 is generated from the cosine beat signal 17 and the cosine signal 14.

The sine sum signal 18 and the cosine sum signal 19 are rectified and low-pass filtered in one embodiment. The low-pass filtering of the sine sum signal 18 and the cosine sum signal 19 produces respectively the envelope curve of the beat between the generated sine beat signal 16 and the sine signal 13 or respectively the curve of the beat between the cosine beat signal 17 and the cosine signal 14. Of course, other methods for the demodulation of the envelopes can also be used.

In a further embodiment, the correction value 12 is generated on the basis of a temporal difference between the minimum 20 of the low-pass filtered sine sum signal 18, i.e. the envelope of the sine sum signal 18, and the minimum 21 of the low-pass filtered cosine sum signal 19, i.e the envelope of the cosine sum signal 19.

The resulting beat when adding two sine signals is based on the following mathematical relationship:

$$\sin(\omega \cdot t + \Delta pd) + \sin(\omega \cdot t - b \cdot t) =$$
$$2 \cdot \sin\left(\frac{\omega \cdot t + \Delta pd + \omega \cdot t - b \cdot t}{2}\right) \cdot \cos\left(\frac{\omega \cdot t + \Delta pd - \omega \cdot t + b \cdot t}{2}\right) =$$
$$2 \cdot \sin\left(\omega \cdot t + \frac{\Delta pd - b \cdot t}{2}\right) \cdot \cos\left(\frac{\Delta pd + b \cdot t}{2}\right)$$

The cosine term of the result thereby characterizes the beat.

At 500 Hz of electrical frequency, 3° of deviation from an angular position of 90° mean a temporal difference of 17 μS. Beats resulting at this difference and having a beat frequency 8 of 1 Hz have a temporal difference of 4 ms at a minimum thereof. The displacement of 17 μS is therefore amplified by a factor of approximately 250. The temporal difference of 4 ms lies in a time range which can be detected and measured without problems using present-day computer systems, e.g. automotive control devices.

Inferences can be made about the amplitudes of the sine signal 13 and the cosine signal 14 from the minimum values of the envelope of the sine sum signal 18 and the envelope of the cosine sum signal 19 because the amplitudes of the respective beat signals 16, 17 are known.

In a further embodiment, the correction value 12 can be filtered with a median filter 37 or another low-pass filter prior to being outputted.

Figure 3:
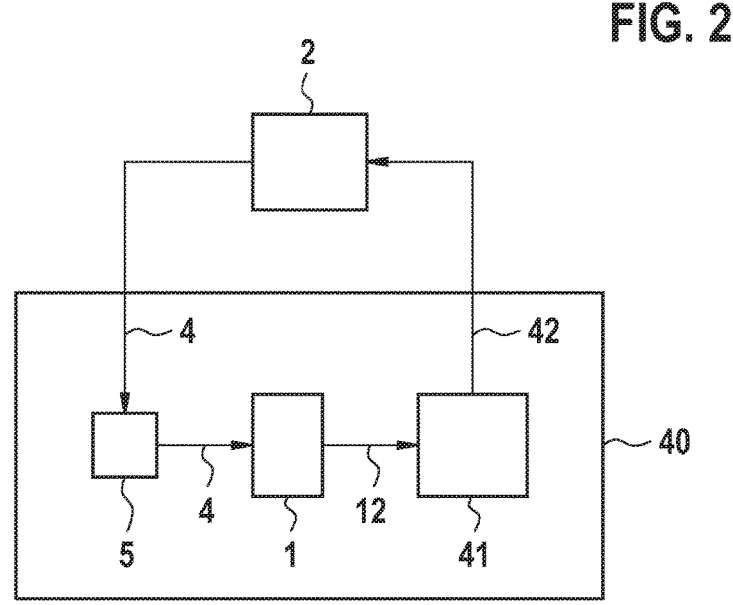
FIG. 3 shows a block diagram of an embodiment of a motor controller according to the invention.

FIG. 3 shows a block diagram of an embodiment of a motor controller 40 according to the invention for an electric machine 2.

The motor controller comprises a control signal generator 41 which is coupled to the electric machine 2. The motor controller further comprises a position sensor 5 which is coupled to the electric machine 2 and a control device 1 according to the invention. The control device 1 is coupled to the control signal generator 41 in order to provide the correction value to said control signal generator.

The control signal generator 41 generates a control signal 42 for an electric machine 2 on the basis of the correction value 12. In one embodiment, the control signal generator 41 can be a motor controller 41 that is implemented in a processor. The control signal generator 41 can also be designed as ASIC or motor control device or the like.

The position sensor 5 detects the rotor position of the electric machine 2 and provides the same to the control device 1, which determines the correction value 12 as described above. To this end, the position sensor can, e.g., be designed as an inductive position transmitter 5, which outputs the sensor signal 4 in the form of a sine signal 13 and a cosine signal 14.

Figure 4:
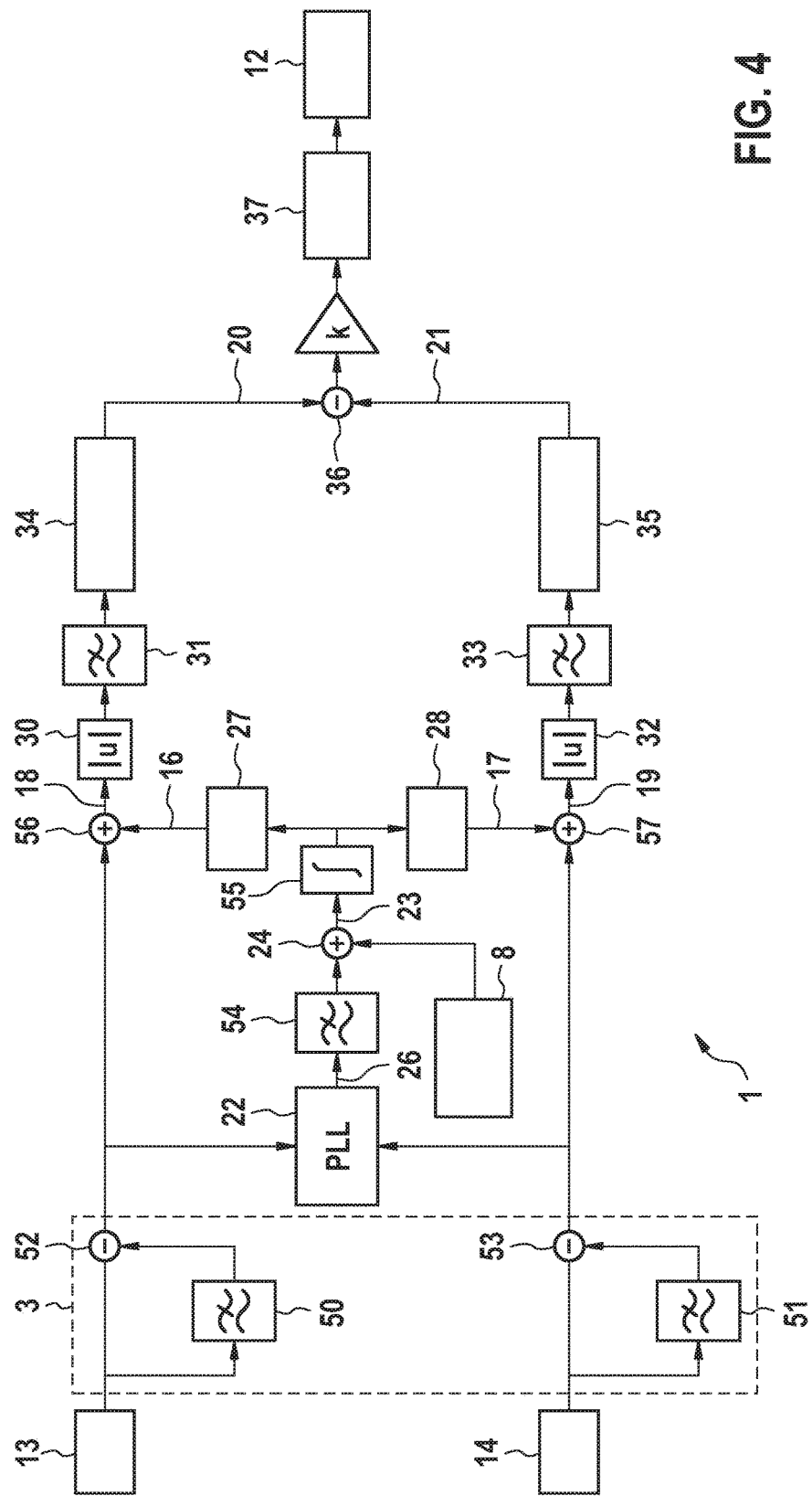
FIG. 4 shows a block diagram of an embodiment of a control device according to the invention.

FIG. 4 shows a block diagram of a further embodiment of a control device 1 according to the invention.

The control device 1 comprises a sensor interface 3 designed to receive a sine signal 13 and a cosine signal 14. The sensor interface 3 comprises a low-pass filter 50 designed to low-pass filter the sine signal 13. The sensor interface further comprises a low-pass filter 51 designed to low-pass filter the cosine signal 14. The low-pass filtered signals 13, 14 are each subtracted from the corresponding original signal by means of a corresponding difference block 52, 53. Thus, the direct component of the sine signal 13 and the cosine signal 14 is determined and removed. The direct component must otherwise be compensated by a more complex implementation of the PLL.

The sine signal 13 processed by the sensor interface 3 and the cosine signal 14 processed by the sensor interface 3 are supplied to the signal generator 6, which for the sake of clarity is not drawn in separately in FIG. 4. Only the components of the signal generator 6 are depicted.

The signal generator 6 has a phase locked loop 22, PLL, to which the sine signal 13 and the cosine signal 14 are supplied. The phase locked loop 22 determines the frequency of the sine signal 13 and the cosine signal 14 from these signals 13, 14, which both have the same frequency 26 (see above).

The signal which has the frequency 26 is low-pass filtered by a low-pass filter 53 and fed to a summation unit 24 which outputs the sum or difference 25 of the beat frequency with the frequency of the sine signal 13 or cosine signal 14 as a signal frequency. This low-pass filtering makes it possible to more precisely parameterize the PLL in order to be able to more precisely follow the frequency. The signal frequency is converted via the integrator 55 into an angle argument for respectively one sine generator 27 and one cosine generator 28.

The sine generator 27 generates the sine beat signal 16 having the signal frequency 23, and the cosine generator generates the cosine beat signal 17 having the signal frequency 23.

An adder 56 adds the sine beat signal 16 to the low-pass filtered sine signal 13 and outputs the sine sum signal 18, and an adder 57 adds the cosine beat signal 17 to the low-pass filtered cosine signal 14 and outputs the cosine sum signal 19.

The correction unit 11, likewise not separately depicted, comprises a first rectifier 30 which rectifies the sine sum signal 18 and a low-pass filter 31 which low-pass filters the rectified sine sum signal 18.

The correction unit 11 furthermore comprises a second rectifier 32 which rectifies the cosine sum signal 19 and a second low-pass filter 33 which low-pass filters the rectified cosine sum signal 19.

The correction unit 11 further comprises a first detector 34, which detects the minimum 20 of the filtered sine sum signal 18 or respectively the point in time at which the minimum 20 occurs in the filtered sine sum signal 18.

The correction unit 11 furthermore comprises a second detector 35 which detects the minimum 21 of the filtered cosine sum signal 19 or respectively the point in time at which the minimum 21 occurs in the filtered cosine sum signal 19.

A differentiator 36 of the correction unit 11 calculates the temporal difference between the point in time of detecting the minimum 20 of the filtered sine sum signal 18 and the point in time of detecting the minimum 21 of the filtered cosine sum signal 19 and outputs this difference as the correction value 12.

A multiplier 38 can multiply the correction value 12 by a factor k. In so doing, the correction value 12 can be adjusted to the value range of a motor controller.

Finally, the correction unit 11 comprises a median filter 37 or low-pass filter which filters the correction value prior to outputting.

Figure 5:
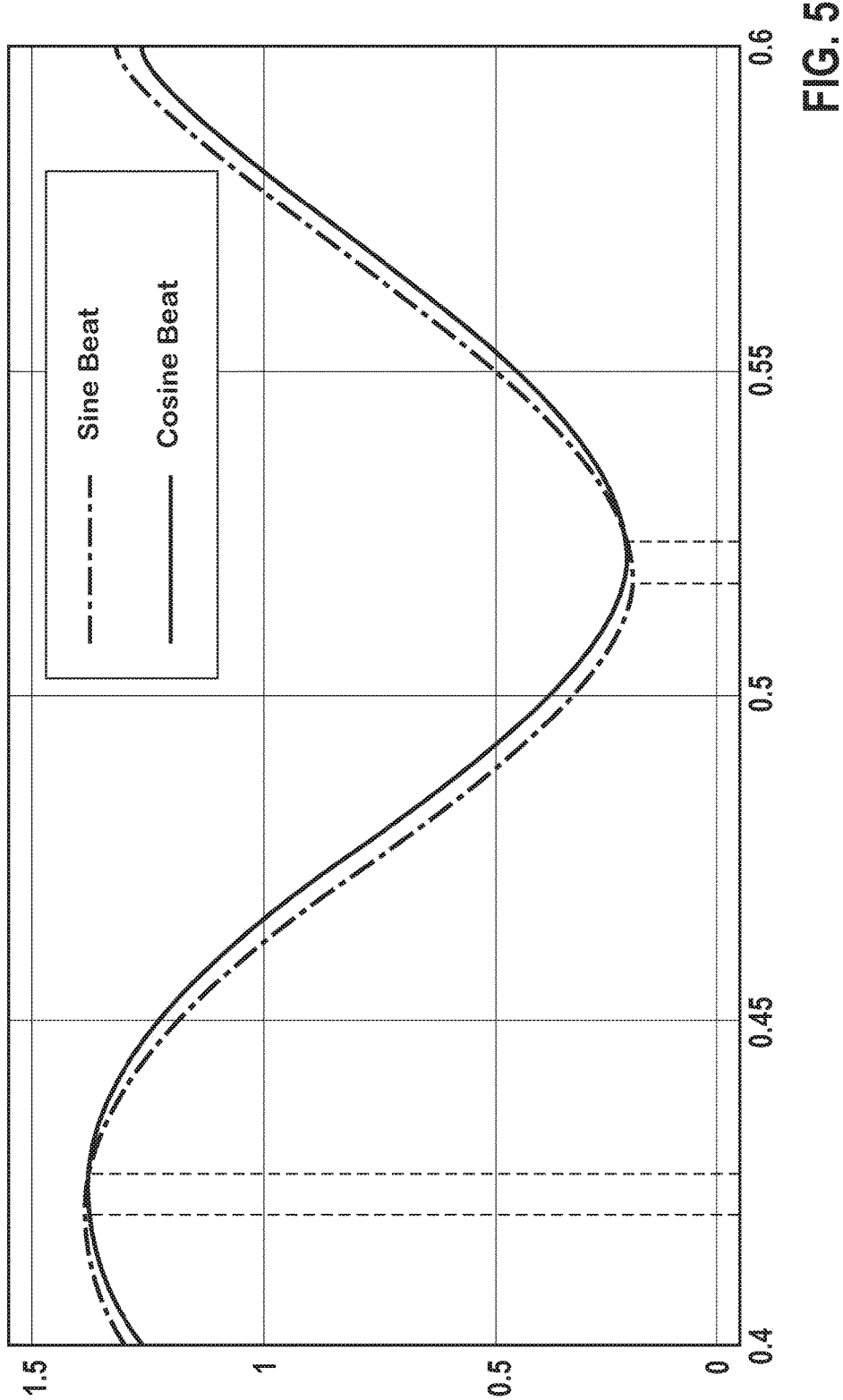
FIG. 5 shows a diagram comprising an embodiment of a sine sum signal according to the invention and a cosine sum signal according to the invention.
Figure 6:
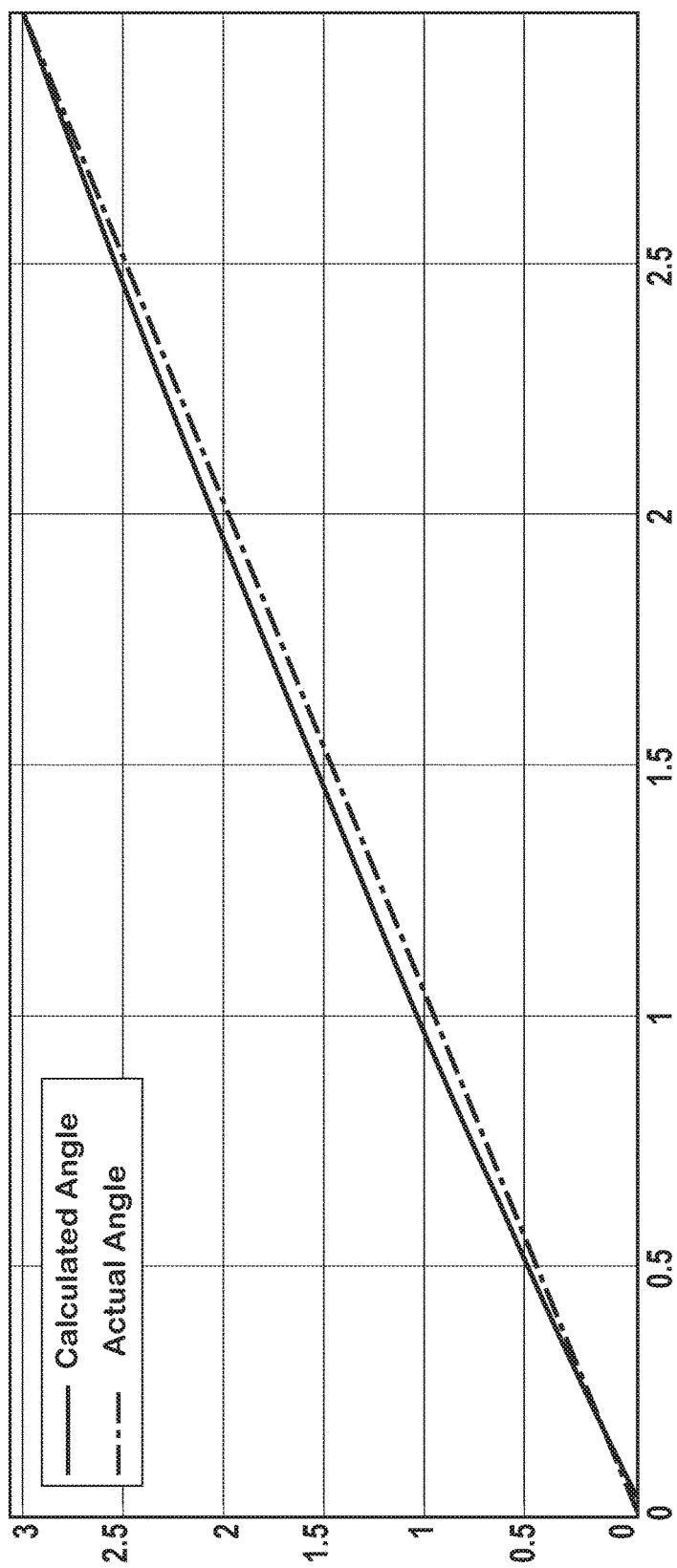
FIG. 6 shows a diagram in which the angular error between the calculated and the actual angle is depicted.

FIG. 5 shows a diagram comprising an embodiment of a sine sum signal 18 according to the invention and a cosine sum signal 19 according to the invention.

The ordinate axis of the diagram shows the amount of the sine sum signal 18 and the cosine sum signal 19. The abscissa axis shows the time from 0.4 s to 0.6 s. In the diagram, a period of the sine sum signal 18 and cosine sum signal 19 are respectively plotted. The sine sum signal 18 and the cosine sum signal 19 have a sinusoidal profile.

The minimum of the sine sum signal 18 lies at 0.521 sec. The minimum of the cosine sum signal 19 lies at 0.525 sec.

The temporal difference between the minimum of the sine sum signal 18 and the cosine sum signal 19 can be clearly recognized in FIG. 5, said difference amounting to 4 msec and being directly proportional to the angular position between sine signal 13 and cosine signal 14. The temporal difference shown in FIG. 5 between the minimum of the sine sum signal 18 and the minimum of the cosine signal 19 represents an error in the angular position between sine signal 13 and cosine signal 14 of 3°.

Although the present invention has been described above using preferred exemplary embodiments, it is not limited thereto but can be modified in a variety of ways. The invention can particularly be altered or modified in multiple ways without deviating from the gist of the invention.

The invention claimed is:

1. A control device (1) for an electric machine (2), the control device comprising:
   a sensor interface (3) designed to receive a sensor signal (4) from a position sensor (5) of the electric machine (2), wherein the position sensor (5) is designed to detect the rotor position of the electric machine (2);
   a signal generator (6) designed to generate a beat signal (7) on the basis of the sensor signal (4), said beat signal corresponding to the sensor signal (4) with a signal frequency (23) increased by a beat frequency (8);
   a summation unit (9) designed to form a sum signal (10) from the sum of the beat signal (7) with the sensor signal (4);
   a correction unit (11) designed to calculate a correction value (12) for the sensor signal (4) on the basis of a minimum (20, 21) of the sum signal (10).

2. The control device according to claim 1,
   wherein the sensor signal (4) comprises a sine signal (13) and a cosine signal (14);
   wherein the signal generator (6) is designed to generate a sine beat signal (16) for the sine signal (13) and a cosine beat signal (17) for the cosine signal (14);
   wherein the summation unit (9) is designed to generate a sine sum signal (18) from the sine beat signal (16) and the sine signal (13) and a cosine sum signal (19) from the cosine beat signal (17) and the cosine signal (14); and
   wherein the correction unit (11) is designed to calculate the correction value (12) on the basis of the temporal difference between the minimum (20) of the sine sum signal (18) and the minimum (21) of the cosine sum signal (19).

3. The control device according to claim 2
   wherein the signal generator (6) comprises a phase locked loop (22), which receives the sine signal (13) and the cosine signal (14) and outputs the frequency (26) of the sine signal (13) and the cosine signal (14), and an adder (24), which outputs the sum (23) of the beat frequency (8) with the frequency (26) of the sine signal (13) and the cosine signal (14) as the signal frequency (23); and
   wherein the signal generator (6) comprises a sine generator (27) designed to generate the sine beat signal (16) having the signal frequency (23) and a cosine generator (28) designed to generate the cosine beat signal (17) having the signal frequency (23).

4. The control device according to claim 3,
   wherein the correction unit (11) comprises a first rectifier (30) designed to rectify the sine sum signal (18) and a first low-pass filter (31) designed to filter the rectified sine sum signal (18); and wherein the correction unit (11) comprises a second rectifier (32) designed to rectify the cosine sum signal (19) and a second low-pass filter (33) designed to filter the rectified cosine sum signal (19).

5. The control device according to claim 4,
wherein the correction unit (11) comprises a first detector (34) designed to detect the minimum (20) of the filtered sine sum signal (18) and a second detector (35) designed to detect the minimum (21) of the filtered cosine sum signal (19); and
wherein the correction device (11) comprises a differentiator (36) designed to calculate the temporal difference between the point in time of the detection of the minimum (20) of the filtered sine sum signal (18) and the point in time of the detection of the minimum (21) of the filtered cosine sum signal (19) and to output said temporal difference as the correction value (12).

6. The control device according to claim 5,
wherein the correction unit (11) comprises a median filter (37) designed to filter the correction value (12) prior to outputting the same.

7. A motor controller (40) for an electric machine, the motor controller comprising:
a control signal generator (41) designed to generate a control signal for the electric machine (2);
a position sensor (5) designed to detect the rotor position of the electric machine (2); and
a control device (1) according to claim 1, which provides a correction value (12) to the control signal generator (6).

8. A method for controlling an electric machine (2), comprising the following steps:
receiving (S1) a sensor signal (4) from a position sensor (5) of the electric machine (2), wherein the position sensor (5) is designed to detect the rotor position of the electric machine (2);
generating (S2) a beat signal (7) on the basis of the sensor signal (4), said beat signal corresponding to the sensor signal (4) having a signal frequency (23) altered by a beat frequency (8);
adding (S3) the beat signal (7) to the sensor signal (4) to form a sum signal (10); and
calculating (S4) a correction value (12) on the basis of a minimum (20, 21) of the sum signal (10).

9. The method according to claim 8,
wherein the sensor signal (4) comprises a sine signal (13) and a cosine signal (14);
wherein a sine beat signal (16) is generated for the sine signal (13) and a cosine beat signal (17) is generated for the cosine signal (14) when generating the beat signal (7);
wherein, during the addition process, a sine sum signal (18) is generated from the sine beat signal (16) and the sine signal (13) and a cosine sum signal (19) is generated from the cosine beat signal (17) and the cosine signal (14); and
wherein, when calculating the correction value (12), the correction value (12) is calculated on the basis of the temporal difference between the minimum (20) of the sine sum signal (18) and the minimum (21) of the cosine sum signal (19).

10. The method according to claim 9,
wherein, when generating the beat signal (7), the frequency (26) of the sine signal (13) and the cosine signal (14) is determined and the sum (25) of the beat frequency (8) with the frequency (26) of the sine signal (13) and the cosine signal (14) is outputted as the signal frequency (23); and
wherein the sine beat signal (16) having the signal frequency (23) is generated and the cosine beat signal (17) having the signal frequency (23) is generated.

11. The method according to claim 10,
wherein, when calculating the correction value (12), the sine sum signal (18) is rectified and the rectified sine sum signal (18) is low-pass filtered; and
wherein, when calculating the correction value (12), the cosine sum signal (19) is rectified and the rectified cosine sum signal (19) is low-pass filtered.

12. The method according to claim 11,
wherein, when calculating the correction value (12), the minimum (20) of the filtered sine sum signal (18) is detected and the minimum (21) of the filtered cosine sum signal (19) is detected, and the temporal difference between the point in time of the detection of the minimum (20) of the filtered sine sum signal (18) and the point in time of the detection of the minimum (21) of the filtered cosine sum signal (19) is calculated, the temporal difference being outputted as the correction value (12).

13. The method according to claim 12,
wherein the correction value (12) is filtered with a median filter (37) prior to being outputted.

14. The method according to claim 13,
wherein said method dispenses with the frequency determination of the sensor signal and instead an angle argument, which corresponds directly to the beat frequency, is read into the sine function (27)/cosine function (28).

* * * * *